F. O. KULLANDER.
HARVESTER REEL ATTACHMENT.
APPLICATION FILED JAN. 26, 1910.
982,072.
Patented Jan. 17, 1911.
2 SHEETS—SHEET 1.
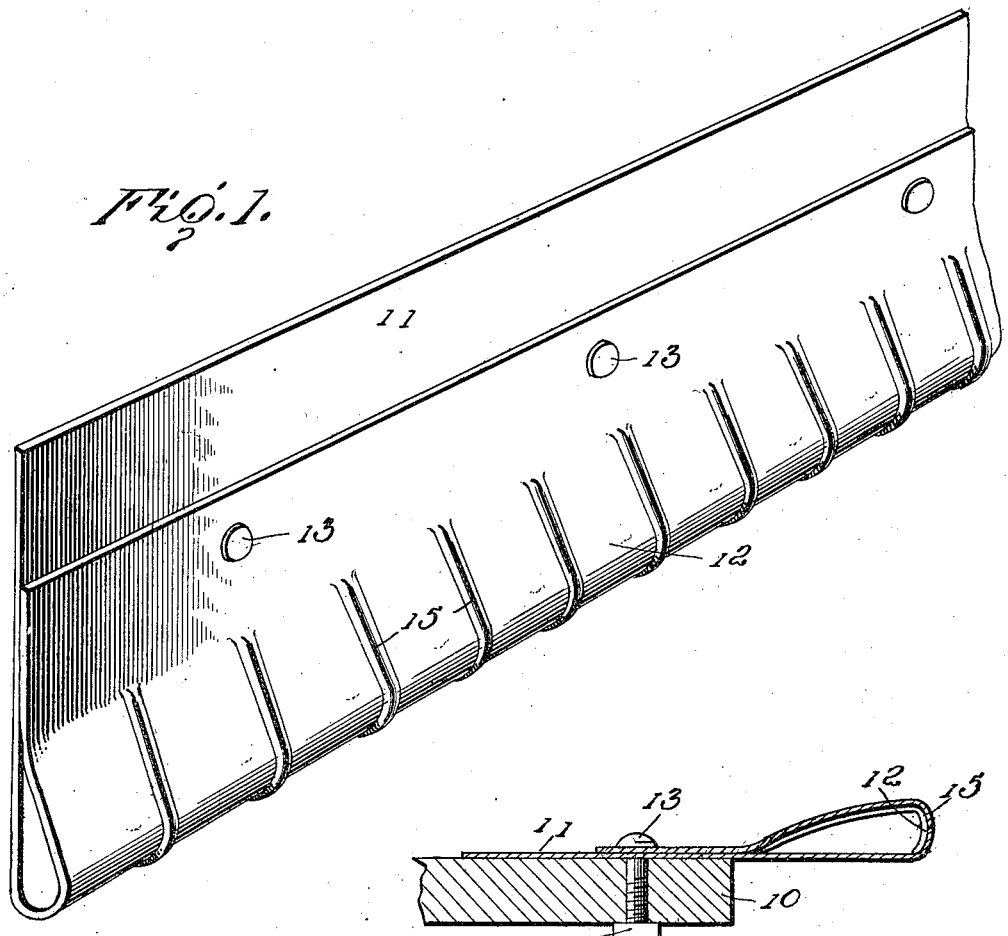
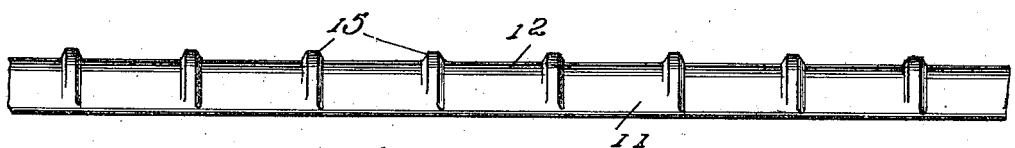

F. O. KULLANDER.
HARVESTER REEL ATTACHMENT.
APPLICATION FILED JAN. 26, 1910.
982,072.
Patented Jan. 17, 1911.
2 SHEETS—SHEET 2.
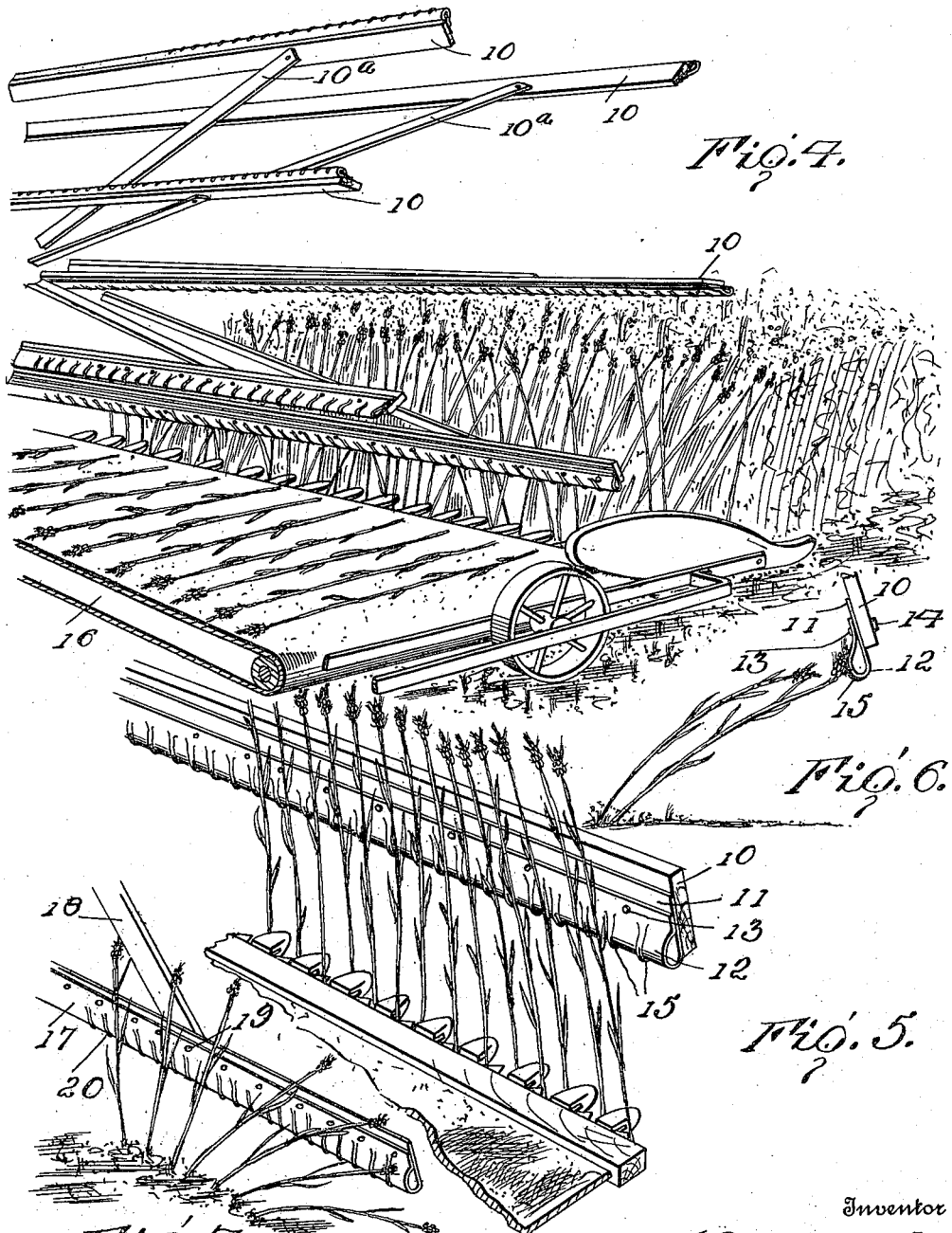

UNITED STATES PATENT OFFICE.

FRANK O. KULLANDER, OF KENSINGTON, MINNESOTA.

HARVESTER REEL ATTACHMENT.

982,072.  Specification of Letters Patent.  Patented Jan. 17, 1911.

Application filed January 26, 1910. Serial No. 540,278.

*To all whom it may concern:*

Be it known that I, FRANK O. KULLANDER, citizen of the United States, residing at Kensington, in the county of Douglas and State of Minnesota, have invented certain new and useful Improvements in Harvester Reel Attachments, of which the following is a specification.

This invention relates to harvesters, having particular reference to an attachment to be applied to the reels of reaping machines.

An object of this invention is to provide a bar to be attached to the reels of reaping machines, the bar being so formed with transverse and spaced ribs as to produce a combing action upon the wheat prior to the cutting of the same; to thereby arrange the stalks in upright parallel relation; and to produce the falling of the stalks transversely upon the lower conveyer after the stalks have been cut.

The invention has for another object the provision of a bar of this character which serves not only to guide and to straighten the bent stalks of wheat prior to the cutting of the same, but also acts as a reinforcement for the reels. The bar is preferably attached directly to the supporting arms of the reel whereby the bar prevents the warping and splitting of the arms and produces a strong and durable reel. The improved bar may also be attached to the slats of the reel to reinforce the same, as it is common to construct the slats of the reels of wood, and when the stalks are damp, a considerable strain is exerted upon the slats incident to their rotation, which frequently causes the splitting and warping of the same.

A further object of this invention is to provide a reaping machine with an improved reel for catching the stalks of wheat which are bent to the ground and for raising the stalks into an upright position and in the path of the cutters of the sickle. To effect this result the improved bar is provided with a rounded surface which is brought into engagement with the ends of the stalks to deflect the same upwardly so that they pass between a plurality of ribs which are formed on the bar to produce a combing action upon the wheat in order to straighten the same and to arrange the stalks in parallel relation to one another.

For a full understanding of the invention reference is to be had to the following description and accompanying drawings in which:—

Figure 1 is a detailed perspective view of a length of the bar employed. Fig. 2 is a transverse section through the bar and one of the ribs formed thereon disclosing the manner of securing the bar to the arm. Fig. 3 is a bottom edge view of the bar. Fig. 4 is a perspective view of a reaping machine disclosing the reel thereof supporting the improved bars and in position after cutting a number of stalks. Fig. 5 is a detailed view of one of the bars in engagement with a number of stalks prior to the cutting of the same. Fig. 6 is an end view of the bar as it first strikes the stalks when bent outwardly from the reaper, and Fig. 7 is a perspective view of a slight modification of the same, disclosing the stalks in a fallen position and leaning toward the ends of the bar.

Corresponding and like parts are referred to in the following description and indicated in all the views of the accompanying drawings by the same reference characters.

Referring to the drawings, and particularly to Fig. 4, the numeral 10 designates the slats of a reel of a reaping machine and which are disclosed as being provided with bars of the improved type. The slats 10 are supported upon a plurality of arms $10^a$ which form the central portion of the reel. The improved bar is formed of a length of sheet metal which is overturned longitudinally and adjacent its lower edge to form a base 11, and a looped or turned over portion 12.

It will be observed from Fig. 2 that the base 11 extends beyond the lower edge of the slat 10 to a considerable distance where the looped portion 12 is formed and where the sheet of metal is turned outwardly at an abrupt angle in the formation of the looped portion 12. The outer edge of the looped portion 12 is bent inwardly and toward the central portion of the base 11, to which the edge is secured by means of a clamping bolt 13 which is passed through the adjacent portions of the bar to hold the looped portion 12 firmly in position. The bolt 13 is extended through the base 11 and the slat 10 and is held in position by a clamping nut 14.

Arranged in spaced relation upon the looped portion 12, are a plurality of ribs 15, which are formed by the offsetting of the body portion of the bar, and which are extended from the outer end of the base 11 to a point adjacent the upper edge of the looped portion 12 so as to dispose the ribs 15 across the lower edge of the bar, and to extend the ribs practically the entire length of the looped portion 12 and upon the outer face of the bar.

It will be observed from Figs. 4 and 5 that the bar is secured to the slat 10 by a plurality of bolts 13 which are arranged in spaced relation and which serve to secure the slat rigidly to the bar. This provision of the bolts 13 through the bars and the slats, insures the strengthening of the slats as well as to rigidly retain the bars in position.

The ribs 15 not only serve as guides for engagement with the grain during the operation of the reel, but also add strength and rigidity to the bar and secures the slat 10 to which the bar is secured.

In Fig. 4 in which is disclosed the application of the bar to the reel, the bar is disclosed as being secured against the side of the slat which is presented to the rear of the machine when adjacent the lower conveyer 16 so as to engage the stalks and to deflect the same backwardly over the lower conveyer 16. In this Fig. 4 is disclosed a number of the stalks after having been cut, and having fallen from the bar. The stalks are shown as lying in parallel relation upon the lower conveyer 16 incident to the action of the ribs 15 which comb the stalks and cause the straightening of the same during the backward movement of the bar.

In Fig. 5 is disclosed the position which the stalks assume under the action of the bar as the same is drawn backwardly against the stalks, wherein the stalks are engaged against the outer face of the bar and are moved into an upright position by reason of the ribs or guides which extend between the same.

In Fig. 6 of the drawings the improved bar is disclosed as being carried upon one of the slats 10 of the reel which is adjacent the ground and are ready for backward movement to engage the stalks. It will be observed that one of the stalks is disclosed in this figure as in engagement with the rounded surface of the looped portion 12 and against one of the ribs 15. Owing to the curvature of the looped portion 12 the end of the stalk is turned upwardly and serves to guide the entire stalk into an upward position as the improved bar is fed rearwardly and downwardly under the rotary action of the reel. The curving of the outer face of the looped portion 12 is therefore believed to be an important feature since the stalks which are bent close to the ground are raised into an upright position and carried into the path of the sickle bar so as to be cut.

In Fig. 7 the improved bar, designated by the numeral 17 is secured upon the outer extremities of the arms 18 of the reel through the medium of suitable clamping bolts 19. It will be observed that the arm 18 engages the bar 17 adjacent its outer end and that the outer edge of the overturned portion of the metal is secured to the base of the bar by the provision of rivets 20 which are arranged in spaced relation throughout the entire length of the bar. The metal from which the bar is formed is believed to offer sufficient resistance to employ the same without the use of the slats, as above disclosed, so that for purpose of economy and to reduce the weight of the reel the slats 10 may be eliminated. In this Fig. 7 the bar 17 is disclosed adjacent the ground and about to be moved rearwardly. The several stalks of wheat are engaged against the bar and several of the stalks are shown as being deflected toward the ground and toward the end of the bar 17. It will be observed that owing to the inclination of the outer face of the looped portion of the bar 16 that the ribs which are formed thereon slidably engage with the stalks and raise the same into an upright position during the backward movement of the bar 17.

In the construction of this device it will be noted that the looped portion 12 is provided for the purpose of not only deflecting the outer ends of the stalks upwardly as the reel is rotated, but also serves the purpose of effecting the combing action of the ribs 15 against the stalks to raise the same from a laterally bent over position into an upward position as the bar is fed rearwardly against the stalks.

By the employment of a bar of this character upon the reel of a reaping machine, bundles of the stalks can be easily formed, by reason of the parallel position of the stalks upon the lower conveyer 16, and such position is insured as the bar is fed backwardly and against the stalks during the falling of the same, thus preventing the wind, or any lateral vibration of the machine, from deflecting the stalks or turning the same across one another.

Having thus described the invention what is claimed as new is:—

1. In combination with a reaping machine having a reel thereon, of a bar arranged across the rear face of each of the slats of said reel, and a plurality of ribs formed upon the lower edge and the outer face of said bar.

2. In combination with the reel of a reaping machine, of bars arranged across the rear faces of the slats of said reel, and a plurality of transverse ribs across the lower edge and the outer face of said bars.

3. A reel attachment including a bar formed of a length of sheet metal looped upon itself at its lower end, and ribs transversely formed at the looped portion of said bar.

4. In combination with a reel having a plurality of slats, of bars arranged across the rear faces of said slats and extending outwardly therefrom, and a plurality of transverse ribs formed in said bars in spaced relation and extending across the lower edges and upwardly of the outer faces thereof.

5. A bar including a length of sheet metal bent upon itself to form a looped portion at its lower end, and a plurality of spaced ribs offset outwardly from the looped portion of said bar.

6. In combination with a reel having a plurality of slats, of bars arranged across the rear faces of said slats, said bars comprising lengths of sheet metal having looped portions, bolts engaged through the overlapped ends of said bars and through said slats to support said bars, and pluralities of spaced ribs formed upon the lower edges of said bars.

In testimony whereof I affix my signature in presence of two witnesses.

FRANK O. KULLANDER. [L. S.]

Witnesses:
R. J. RASMUSSON,
EDW. OLSON.